United States Patent
Homan et al.

(10) Patent No.: US 6,776,123 B2
(45) Date of Patent: Aug. 17, 2004

(54) NATURAL DENTAL RING FOR CATS FELINE TEETHING AND TEETH CLEANING APPARATUS

(76) Inventors: Teresa Ann Homan, 5258 Rte. 873, Schnecksville, PA (US) 18078; Daniel Webster Homan, 5258 Rte. 873, Schnecksville, PA (US) 18078; Courtney Ann Homan, 5258 Rte. 873, Schnecksville, PA (US) 18078

( * ) Notice: Subject to any disclaimer, the term of this patent is extended or adjusted under 35 U.S.C. 154(b) by 0 days.

(21) Appl. No.: 10/348,572

(22) Filed: Jan. 21, 2003

(65) Prior Publication Data

US 2004/0139927 A1 Jul. 22, 2004

(51) Int. Cl.[7] .............................................. A01K 29/00
(52) U.S. Cl. ...................................... 119/709; 119/711
(58) Field of Search .................. 119/707, 709–711; D30/199, 160, 158

(56) References Cited

U.S. PATENT DOCUMENTS

| | | | |
|---|---|---|---|
| D330,614 S | * 10/1992 | O'Rourke | D30/160 |
| 6,318,300 B1 | * 11/2001 | Renforth et al. | 119/708 |
| D470,277 S | * 2/2003 | Tu | D30/160 |

* cited by examiner

Primary Examiner—Charles T. Jordan
Assistant Examiner—Kimberly S. Smith

(57) ABSTRACT

A feline teething and teeth cleaning toy in which the combination of elements functions as a natural complete dental care device in a manner consistent with that of a toothbrush and dental floss while assisting the natural digestive process of cats. The combination of elements, a bone ring wound with natural hemp, natural feather(s) and natural dried catnip leaves utilizes a cat's natural instincts to promote its overall effectiveness. As cats instinctively enjoy playing with the toy, the chewing of the ring and hemp gently brushes and scraps the teeth and stimulates the gums. The chewing and pulling of the extended feather(s) and hemp through the teeth flosses the teeth and the consumption of the natural dried catnip leaves assists the cat's natural digestive process.

6 Claims, 1 Drawing Sheet

NATURAL DENTAL RING FOR CATS FELINE TEETHING AND TEETH CLEANING APPARATUS

BACKGROUND OF THE INVENTION

1. Field of the Invention

This invention generally resides in the field of domestic pet teething toys and more particularly, designed especially for cats which functions as a natural complete dental care device in the same manner as a toothbrush and dental floss.

2. Description of the Prior Art

In the process of the domestication of cats as household pets, most to all of the cats resources for natural teeth cleaning have been eliminated or removed. Cats raised in years past on large farmlands, which are rapidly diminishing, had access to instinctive natural means of cleaning their teeth. Such resources included bones and feathers of their prey, since by instinct cats are hunters, and natural wild plants or herbs, such as catnip which also aids in the cats digestive process. These natural means of cleaning their teeth have been replaced with artificial attempts at dental care.

Dental disease is, unfortunately, one of the most common conditions seen in cats. Much of a cats overall health is dependent upon their oral health condition. Generally a cat with a healthy mouth is a healthy cat. One of the current suggested means of keeping cats teeth clean is to brush them with special toothpaste and a toothbrush. This is generally disliked by all cats and requires the service of their human counterparts. It is also, basically an impossible task to perform with a cat that has been seriously abused, neglected or abandoned by their previous human counterparts and currently resides in a protective animal shelter.

Other alternative devices that are available for cat dental care are dental care treats with artificial ingredients which cats generally do not chew long enough to provide enough cleaning benefit, chew toys such as rawhide which generally do not appeal to cats and varied other devices that provide limited to no dental cleaning benefit. Therefore, there exists an essential need for a toy that is specifically designed to provide cats with a natural and desirable device capable of complete dental care while they enjoy playing with it.

SUMMARY OF THE INVENTION

The main objective of this invention is the development of a complete dental care apparatus or toy for cats that is naturally desirable to the animal and provides an effective and stress-free process of promoting complete dental health and assists the natural digestive process of cats. This objective is obtained through the combination of the elements of the apparatus.

The particular apparatus may be described as a bone ring of fixed diameter wound with natural hemp cord incorporating (by binding to the ring with the hemp) one or more natural feather types, which feather(s) extend outward from the ring and hemp, the two ends of the hemp are knotted and extend outward from the ring as the feather(s), all of which is impregnated with natural dried catnip leaves.

The bone ring wound with hemp provides a gentle abrasive brushing and scraping action when chewed by the cat similar to that of a human toothbrush. The shape, size, flexibility and durability of the ring allows for complete teeth cleaning even to the back teeth where tarter and plaque can build up without any fear or danger of it being swallowed in whole or part. It also provides for the stimulation of the gums, which is important to a cat's dental health. The extension of the hemp and feathers acts as a natural dental floss as it is pulled through their teeth as they play and gnaw. The natural dried catnip leaves are irresistible to almost any cat making the apparatus extremely desirable and entices the cat into a playful frenzy. The natural dried catnip leaves when pulled from the apparatus and eaten by the cat provide assistance to the digestive process of the cat. Therefore, providing a complete dental care apparatus utilizing a cat's instinctive natural desires to promote its overall effectiveness.

DESCRIPTION OF THE PREFERRED EMBODIMENT

The Natural Dental Ring for Cats Feline Teething and Teeth Cleaning Apparatus embodying the present invention comprises a combination of elements for complete dental care in communion with a cat's natural instincts and desires to ensure overall effectiveness while assisting the natural digestive process of cats.

Figure 1:
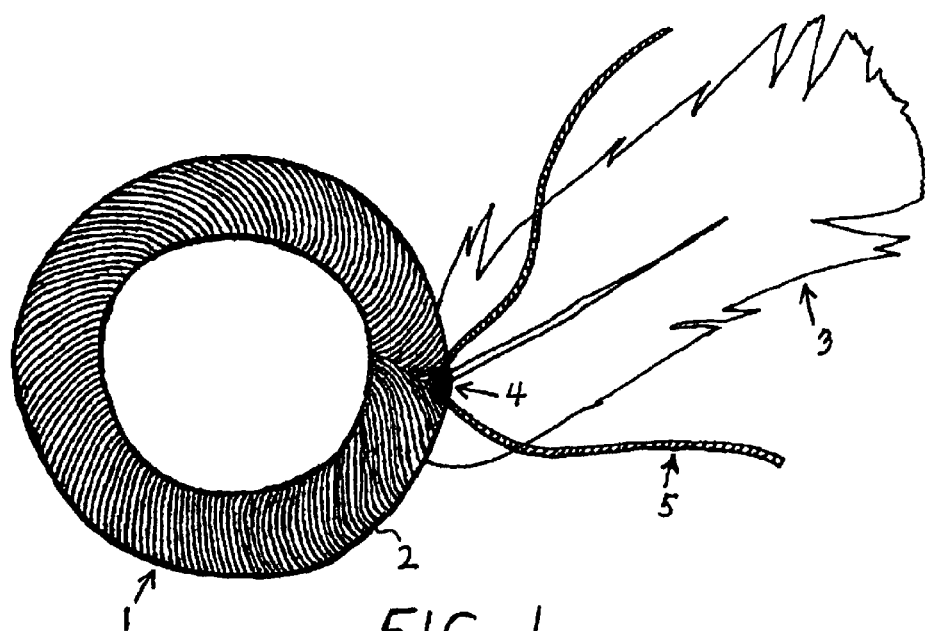
FIG. 1 shows a view of the Natural Dental Ring for Cats Feline Teething and Teeth Cleaning Apparatus.
Figure 2:
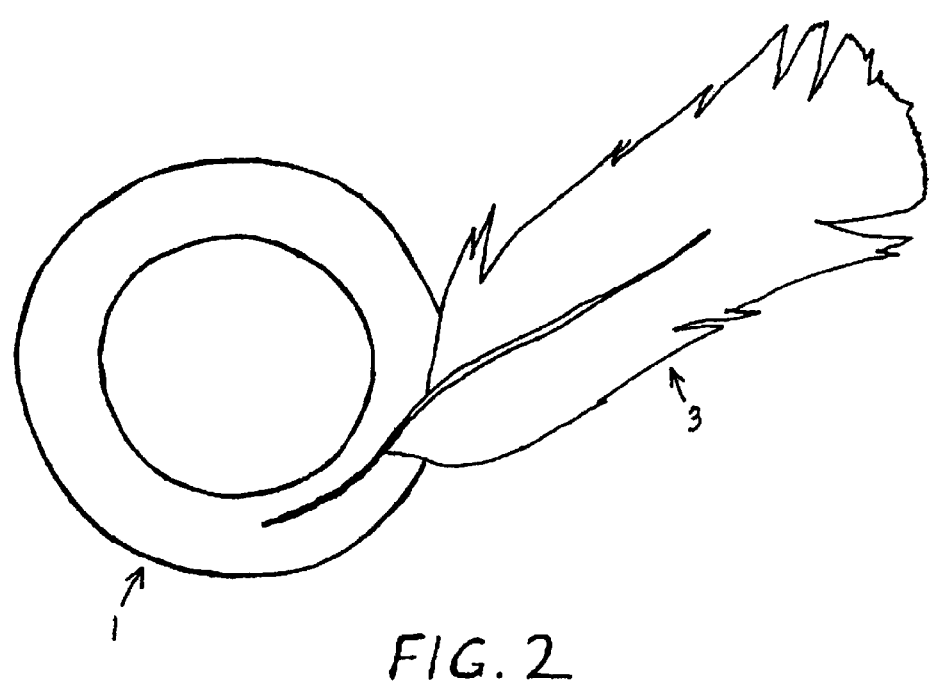
FIG. 2 shows a view of the incorporating of the feather(s) with the bone ring before binding both together with natural hemp cord of said dental apparatus.

The bone ring 1 shown in FIGS. 1 and 2 is a stable, flexible, lightweight, durable and unbreakable plastic ring 2 inches in diameter with a thickness of about ¼ of an inch. The bone ring is utilized over other types of rings available because of its unique characteristics and inherit safety features. The flexibility allows the cat to bite and chew providing them with a sensation of "sinking their teeth in" rather than biting into a hard object having no elasticity yet maintains its shape and integrity. The size and shape allows access to all areas of the cat's mouth including the back teeth where tarter and plaque can build up without any danger or fear of it being swallowed in whole or part since it is unbreakable.

The bone ring is then wound by binding tightly by hand with 20 lb. 100% natural hemp cord or similar natural cord attractive to cats which has been stored in a sealed container of natural dried catnip leaves before use as shown in 2 of FIG. 1. The bone ring wound with natural hemp provides a gentle abrasive brushing and scraping action when chewed by the cat similar to that of a human toothbrush. It also provides for the stimulation of the gums, which is an important factor to a cat's dental health. The natural dried catnip leaves impregnating the hemp are irresistible to almost any cat making the apparatus extremely desirable and entices the cat into a playful frenzy of biting and chewing the ring and hemp.

One or more natural feather types attractive to cats is incorporated to the bone ring by binding the ring and feather(s) together with the hemp with the feather(s) extending outward from the ring and hemp as shown in 3 of FIGS. 1 and 2. The natural feather types are obtained from various sanctuaries and bird raisers from the various birds natural molting process. The feathers are boiled in hot water to kill any germs, which may be present, air dried and then stored in a sealed container of natural dried catnip leaves until used. Upon the binding of the feather(s) to the ring with the hemp, the two ends of the hemp are tightly knotted 4 and extend outward from the ring approximately 2 inches 5 along with the feather(s) 3 as shown in FIG. 1.

The extension of the hemp and feather(s) impregnated with natural dried catnip leaves acts as natural dental floss as the cat pulls the feather(s) and hemp through their teeth as they play and gnaw which removes tarter and plaque from between their teeth. The natural dried catnip leaves when pulled from the apparatus and eaten by the cat provide natural assistance to the digestive process of the cat. Therefore, providing a complete dental care apparatus utilizing a cat's instinctive natural desires to promote its overall effectiveness and assist the digestive process as they enjoy playing with the apparatus.

While the preferred embodiment of the invention has been shown and described, it will be apparent to those skilled in this art that various modifications may be made in this embodiment without departing from the teachings of the present invention.

What we claim as our invention is:

1. A method of making a natural dental care device for cleaning teeth of a cat while playing, comprising:

providing a bone ring impregnated with natural catnip leaves, wrapping said bone ring in a natural cord such that the entire surface area of the bone ring is contacted by said natural cord, wherein cord is laced with dried catnip leaves and has a gentle abrasive texture, binding one or more natural feathers being impregnated with natural catnip leaves to the bone ring during the wrapping step such that the one or more feathers extend outwardly from the wrapped bone ring; and, tightly knotting two free ends of the natural cord thereby securing the one or more feathers and natural cord to the bone ring such that a length of natural cord extends outwardly in a substantially straight manner from the device thereby acting as a natural flossing for the cat as the length of natural cord is pulled through the cats teeth.

2. The method of making a natural dental care device of claim 1, wherein the bone ring is stored in a sealed container containing natural catnip leaves prior to assembly of the device.

3. The method of making a natural dental care device of claim 1, wherein the natural cord is hemp cord.

4. The method of making a natural dental care device of claim 3, wherein the hemp cord is stored in a sealed container containing natural dried catnip leaves prior to assembly of the device.

5. The method of making a natural dental care device of claim 1, wherein the one or more feathers are stored in a sealed container containing natural dried catnip leaves prior to assembly of the device.

6. The method of making a natural dental care device of claim 1, wherein the natural dental care device is stored in sealed containers containing natural dried catnip leaves prior to use by the cat.

* * * * *